US012633563B1

(12) United States Patent
Rehman et al.

(10) Patent No.: US 12,633,563 B1
(45) Date of Patent: May 19, 2026

(54) REDOX FLOW BATTERY

(71) Applicant: KING FAHD UNIVERSITY OF PETROLEUM AND MINERALS, Dhahran (SA)

(72) Inventors: Ata-Ur Rehman, Dhahran (SA); Shahid Ali, Dhahran (SA); Muhammad Mansha, Dhahran (SA); Safyan Akram Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/215,052

(22) Filed: May 21, 2025

(51) Int. Cl.
*H01M 8/18* (2006.01)

(52) U.S. Cl.
CPC .................................. *H01M 8/188* (2013.01)

(58) Field of Classification Search
None
See application file for complete search history.

(56) References Cited

U.S. PATENT DOCUMENTS

| | | | | |
|---|---|---|---|---|
| 2023/0078901 A1* | 3/2023 | Kamochi | H01M 8/1039 429/105 |
| 2024/0304840 A1* | 9/2024 | Sisto | H01M 8/04197 |
| 2024/0332585 A1 | 10/2024 | Sisto et al. | |

FOREIGN PATENT DOCUMENTS

| | | | |
|---|---|---|---|
| CN | 104945276 A | * | 9/2015 |
| CN | 104945276 B | * | 6/2017 |

(Continued)

OTHER PUBLICATIONS

CN-104945276-B English machine translation (Year: 2017).*

(Continued)

*Primary Examiner* — Scott J. Chmielecki
(74) *Attorney, Agent, or Firm* — Oblon, McClelland, Maier & Neustadt, L.L.P.

(57) ABSTRACT

A redox flow battery includes a positive electrode, a catholyte solution in contact with the positive electrode, a negative electrode, an anolyte solution in contact with the negative electrode, and a separator separating the catholyte solution and the anolyte solution. The anolyte solution includes an organic diazene of formula (I) and a first hydroxide base (I)

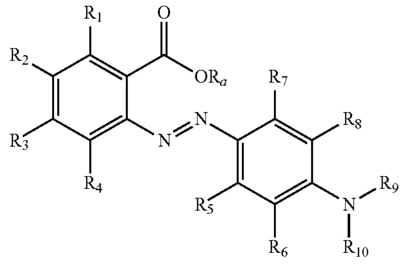

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and $R_a$ is selected from the group consisting of a hydrogen atom, an optionally substituted alkyl, an optionally substituted cycloalkyl, an optionally substituted alkoxy, an alkali metal cation, ammonium, and an organoammonium cation.

17 Claims, 11 Drawing Sheets

Anthranilic Acid N,N-Dimethyl Aniline Sodium (E)-2-((4-dimethylamino)phenyl)diazenyl) benzoate

(56) References Cited

FOREIGN PATENT DOCUMENTS

| | | | | | |
|---|---|---|---|---|---|
| CN | 110085895 A | * | 8/2019 | ............ | H01M 8/188 |
| CN | 110085895 B | * | 9/2020 | ............ | C02F 1/4672 |
| CN | 114315704 8 | | 3/2024 | | |
| CN | 117712438 A | | 3/2024 | | |

OTHER PUBLICATIONS

CN-110085895-B English machine translation (Year: 2020).*

Product information for sodium (E)-2-((4-(dimethylamino)phenyl)diazenyl)benzoate from Fisher Scientific, available at https://www.fishersci.com/us/en/browse/cas/845-46-5 (Year: 2025).*

M.P.E.P. 608.02(d).*

Calving Wang, et al., "Highly water-soluble 6-quinoxalinecarboxylic acid for high-voltage aqueous organic redox flow batteries", ACS Applied Energy Materials. 2022, vol. 5, Issue 9, 7 Pages.

* cited by examiner

Anthranilic Acid N,N-Dimethyl Aniline Sodium (E)-2-((4-dimethylamino)phenyl)diazenyl) benzoate

REDOX FLOW BATTERY

STATEMENT OF PRIOR DISCLOSURE BY AN INVENTOR

Aspects of the present disclosure are described in Ali, Shahid, et al. "Low Molecular Mass Diazenyl Derivative as High-Performance Anolyte in Aqueous Organic Redox Flow Batteries." Available at SSRN 5139647 (2025).

STATEMENT OF ACKNOWLEDGEMENT

Support provided by the King Fahd university of Petroleum and Mineral (KFUPM), Dhahran, Saudi Arabia under the IRC-HTCM project #INHE2307 is gratefully acknowledged.

BACKGROUND

Technical Field

The present disclosure relates to electrochemical energy storage systems, more particularly, the present disclosure pertains to redox flow batteries including organic redox-active compounds in aqueous electrolytes.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The global energy landscape has increasingly shifted toward clean and renewable sources such as solar, wind, and bioenergy. The rapid expansion in portable electronics and electro-mobility applications has created a demand for high energy density storage technologies capable of delivering stable and scalable performance. While metal-ion battery systems currently fulfil many of these requirements, limitations associated with cost, safety, and suitability for grid-level applications restrict broader deployment thereof. Redox flow batteries (RFBs), particularly metal-based systems, have emerged as scalable electrochemical energy storage platforms with advantages in modularity, operational flexibility, and cost-effective large-scale deployment. The aforesaid systems allow for independent scaling of energy and power components and offer operational safety and customizable chemistries for diverse applications.

Among emerging battery technologies, redox flow batteries utilizing organic redox-active species referred to as organic redox flow batteries (ORFBs) have attracted significant attention due to structural tunability and the possibility of accessing a wide electrochemical potential window of up to 4 V. Organic molecules offer the potential for low-cost, metal-free, and environmentally benign battery chemistries. Despite the mentioned benefits, commercial progress of ORFBs has been hampered by limitations including low ionic conductivity, volatility of some organic solvents, and reduced stability of organic redox species in oxidized or reduced states of ORFBs [See: Ramar, A.; Wang, F.-M.; Foeng, R.; Hsing, R. *Journal of power sources*, Al Raihan, M.; Dyker, C. A. *Journal of energy chemistry Journal of Power Sources* 558, 2023, 232611., and Leung, P.; Shah, A. A.; Sanz, L.; Flox, C.; Morante, J. R.; Xu, Q.; Mohamed, M. R.; De León, C. P.; Walsh, F. C. *Journal of Power Sources* 360, 2017, 243-283.].

Recent developments have introduced aqueous organic redox flow batteries (AORFBs), which utilize water-soluble organic redox-active species in aqueous electrolytes to further enhance safety, reduce costs, and eliminate the use of flammable solvents. Several commercial demonstrations, including systems developed by Kemiwatt (France) and Jena Batteries (Germany), have illustrated the potential of AORFBs for scalable, metal-free energy storage. However, many organic redox-active species suffer from poor solubility in neutral aqueous environments and require the use of strongly acidic or alkaline media and sometimes co-electrolytes to improve solubility, enhance redox kinetics, and maintain chemical stability. Although the theoretical thermodynamic stability window of water is 1.23 V, this limitation may be relaxed in practical systems depending on electrolyte composition, and the use of porous carbon electrodes such as carbon felt has been reported to suppress competing water-splitting reactions [See: Hu, B.; DeBruler, C.; Rhodes, Z.; Liu, T. L. *Journal of the American Chemical Society* 139, (3), 2017, 1207-1214.].

A diverse range of organic compounds has been explored as anolyte materials for redox flow batteries, including viologens, phenazines, thiazines, fluorenones, quinones, amides, and azo compounds [See: Singh, V.; Kim, S.; Kang, J.; Byon, H. R. *Nano Research* 2019, 12, 1988-2001, and Mansha, M.; Ayub, A.; Khan, I. A.; Ali, S.; Alzahrani, A. S.; Khan, M.; Arshad, M.; Rauf, A.; Akram Khan, S. *The Chemical Record* 24, (1), 2024, e202300284]. The electrochemical properties of these molecules can be tuned by varying substituents, enabling modification of solubility, redox potential, and stability. Nevertheless, the aqueous solubility of many such compounds remains limited, and there is a need for further exploration of functional group modifications to improve their performance in aqueous environments. Additionally, the pairing of suitable anolyte and catholyte materials remains a technical constraint, with relatively few effective combinations identified for practical AORFB implementation [See: Shoaib, M.; Vallayil, P.; Jaiswal, N.; Iyapazham Vaigunda Suba, P.; Sankararaman, S.; Ramanujam, K.; Thangadurai, V. *Advanced Energy Materials* 2024, 2400721].

Among candidate materials, azobenzene-based molecules present a promising class of redox-active species due to their availability, structural diversity, and potential hydrophilicity. The azo group (—N═N—) is capable of undergoing reversible two-electron redox processes, which may contribute to high capacity in AORFBs. However, the symmetrical nature of the azo linkage often imparts hydrophobicity, limiting aqueous solubility and practical application. Functionalization with hydrophilic substituents offers a potential strategy to overcome the aforementioned limitation.

In view of the above stated challenges and limitations, there exists a requirement for development of structurally simple, low-molecular-mass azo-based redox-active compounds with enhanced aqueous solubility, redox reversibility, and electrochemical stability under alkaline conditions. Accordingly, one object of the present disclosure is to provide a redox flow battery, that may circumvent the above specified drawbacks and limitation of the methods known in the art.

SUMMARY

In an exemplary embodiment, a redox flow battery is disclosed. The redox flow battery includes a positive electrode, a catholyte solution in contact with the positive electrode, a negative electrode, an anolyte solution in contact with the negative electrode, and a separator separating the catholyte solution and the anolyte solution. The anolyte solution includes an organic diazene of formula (I) and a first hydroxide base (I)

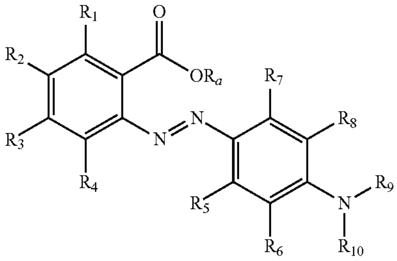

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and $R_a$ is selected from the group consisting of a hydrogen atom, an optionally substituted alkyl, an optionally substituted cycloalkyl, an optionally substituted alkoxy, an alkali metal cation, ammonium, and an organoammonium cation.

In some embodiments, the organic diazene of formula (I) is (E)-2-((4-(dimethylamino)phenyl)diazenyl)benzyl carboxylic acid or a salt thereof.

In some embodiments, the organic diazine of formula (1) is sodium (E)-2-((4-(dimethylamino)phenyl)diazenyl)benzoate.

In some embodiments, the organic diazene is present in the anolyte solution in an amount of 0.1 to 10 mM.

In some embodiments, the first hydroxide base is potassium hydroxide.

In some embodiments, the anolyte solution has a hydroxide base concentration of 0.25 to 2.5 M.

In some embodiments, the catholyte solution includes an iron coordination complex and a second hydroxide base.

In some embodiments, the iron coordination complex is present in the catholyte solution in an amount of 0.1 to 10 mM.

In some embodiments, the iron coordination complex is ferrocyanide.

In some embodiments, the catholyte solution has a hydroxide base concentration of 0.25 to 2.5 M.

In some embodiments, the second hydroxide base is potassium hydroxide.

In some embodiments, the redox flow battery has a cell potential of 0.75 to 1.50 V.

In some embodiments, the redox flow battery has a volumetric capacity of 500 to 1000 mAh/L.

In some embodiments, the redox flow battery has a coulombic efficiency of greater than 60%.

In some embodiments, the redox flow battery has a sustained a discharge capacity of 10 to 30 mAh/g after 100 charge-discharge cycles at a current density of 10 mA $cm^{-2}$.

In some embodiments, the positive electrode and negative electrode are each a carbon felt electrode.

In some embodiments, the separator is formed of a tetrafluoroethylene-perfluoro(3-oxa-4-pentenesulfonic acid) copolymer.

In another exemplary embodiment, a method of forming the redox flow battery is described. The method includes sandwiching the separator between the positive electrode and the negative electrode, forming the catholyte solution, forming the anolyte solution, and contacting the catholyte solution with the positive electrode and the anolyte solution with the negative electrode.

In some embodiments, the above described method further includes forming the organic diazene of formula (I) by reacting an anthranilic acid derivative of formula (II) with an aniline of formula (III) in the presence of a nitrite salt, (II)

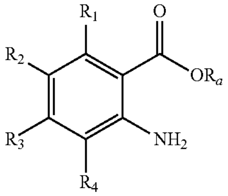

(III)

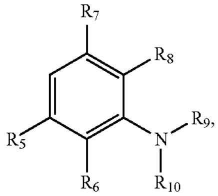

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and. Further, $R_a$ is selected from the group consisting of a hydrogen atom, an optionally substituted alkyl, an optionally substituted cycloalkyl, an optionally substituted alkoxy, an alkali metal cation, ammonium, and an organoammonium cation.

In some embodiments, the anthranilic acid derivative of formula (II) is anthranilic acid, the aniline of formula (III) is N,N-dimethylaniline, and the nitrite salt is sodium nitrite.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
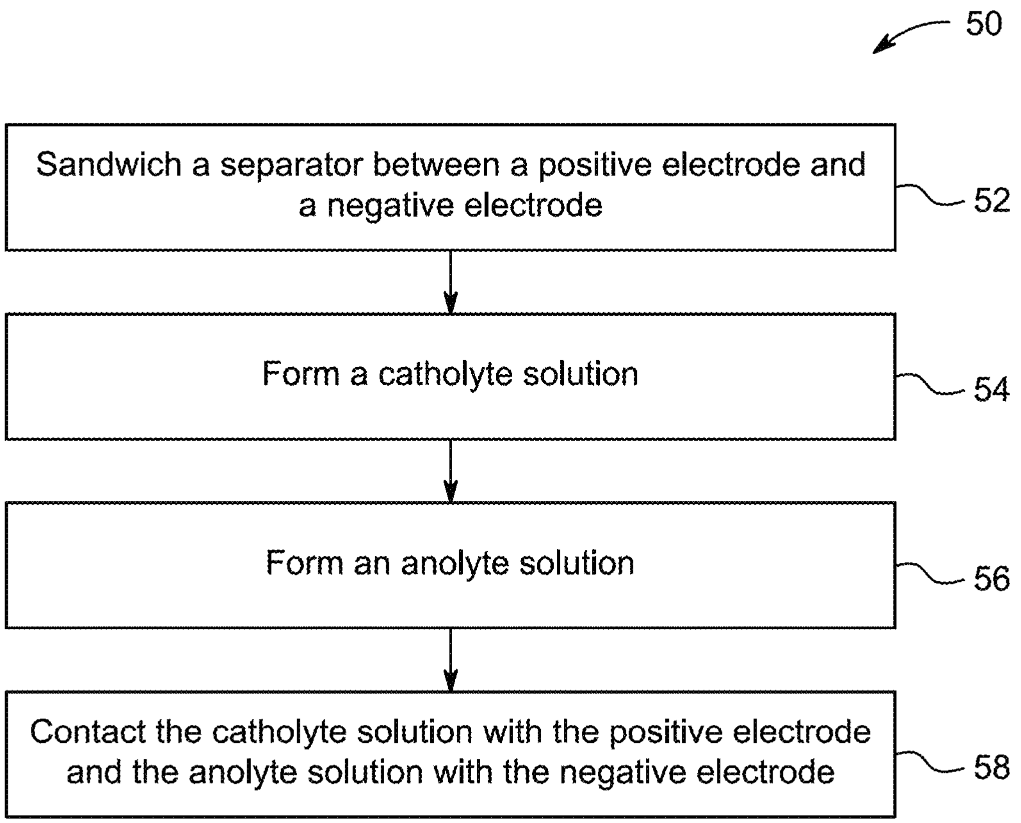
FIG. 1A is a flowchart of a method of forming the redox flow battery, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, reference numerals designate identical or corresponding parts throughout several views. Further, as used herein, the words 'a', 'an' and the like generally carry a meaning of 'one or more,' unless stated otherwise.

Furthermore, the terms 'approximately', 'approximate', 'about', and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

As used herein, the term 'room temperature' refers to a temperature range of '25 degrees Celsius (° C.) ±3° C. in the present disclosure.

As used herein, the term 'redox flow battery' refers to a type of rechargeable battery where energy is stored in liquid electrolytes containing redox-active species, which flow through an electrochemical cell to facilitate energy conversion and storage during charging and discharging cycles.

As used herein, the term 'positive electrode' refers to a electrode in a redox flow battery where reduction reactions occur during discharging, typically accepting electrons from the external circuit and undergoing reduction of the electroactive species in the catholyte solution.

As used herein, the term 'negative electrode' refers to a electrode in a redox flow battery where oxidation reactions occur during discharging, typically donating electrons to the external circuit and undergoing oxidation of the electroactive species in the anolyte solution.

As used herein, the term 'catholyte solution' refers to a liquid electrolyte in a redox flow battery that contains redox-active species and is associated with the positive electrode, where the reduction half-reaction takes place during the battery's discharge process.

As used herein, the term 'anolyte solution' refers to a liquid electrolyte in a redox flow battery that contains redox-active species and is associated with the negative electrode, where the oxidation half-reaction takes place during the battery's discharge process.

As used herein, the term 'cell potential' refers to a measure of the voltage difference between the positive and negative electrodes of a redox flow battery during charge or discharge, which indicates the driving force for electron flow in the external circuit.

As used herein, the term 'volumetric capacity' refers to a measure of the energy storage capacity of a redox flow battery, typically expressed in milliampere-hours per liter (mAh/L), indicating the amount of charge the electrolyte solution can store in relation to its volume.

As used herein, the term 'coulombic efficiency' refers to a ratio of the total charge extracted from the battery during discharge to the total charge supplied to the battery during charging, expressed as a percentage, indicating the efficiency of charge transfer in the system.

As used herein, the term 'discharge capacity' refers to a measure of the amount of energy a redox flow battery can deliver during the discharge process, typically expressed in milliampere-hours per gram (mAh/g), representing the total charge extracted per unit of active material in the anolyte or catholyte.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

An aspect of the present disclosure is directed to forming a redox flow battery utilizing a low molecular mass azobenzene-based anolyte with high solubility in alkaline aqueous medium, coupled with potassium ferrocyanide catholyte, achieving efficient cell potential.

A redox flow battery is described. The redox flow battery includes a positive electrode, a catholyte solution in contact with the positive electrode, a negative electrode, an anolyte solution in contact with the negative electrode, and a separator separating the catholyte solution and the anolyte solution. In some embodiments, positive and negative electrodes may include, but are not limited to, graphite electrode, activated carbon electrode, carbon paper electrode, graphene electrode, carbon nanotube electrode, carbon black electrode, glassy carbon electrode, pyrolytic graphite electrode, carbon paste electrode, graphite foam electrode, carbon fiber electrode, boron-doped diamond electrode, multi-walled carbon nanotube electrode, single-walled carbon nanotube electrode, activated carbon cloth electrode, carbon aerogel electrode, carbon composite electrode, electrochemically modified carbon electrode, porous carbon electrode, and carbon-based nanostructure electrode. In a preferred embodiment, the positive electrode and negative electrode are each a carbon felt electrode.

In some embodiments, the anolyte solution includes an organic diazene of formula (I) and a first hydroxide base.

(I)

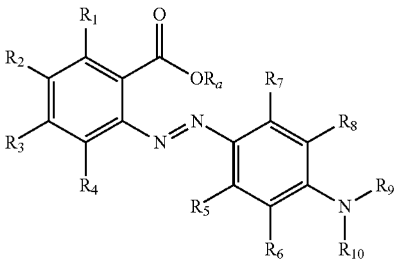

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and Ra is selected from the group consisting of a hydrogen atom, an optionally substituted alkyl, an optionally substituted cycloalkyl, an optionally substituted alkoxy, an alkali metal cation, ammonium, and an organoammonium cation.

In some embodiments, the organic diazene may include, but is not limited to, (E)-2-((4-(dimethylamino)phenyl)diazenyl)benzoic acid, (E)-4-((4-(dimethylamino)phenyl)diazenyl)benzoic acid, (E)-3-((4-(dimethylamino)phenyl)diazenyl)benzoic acid, (E)-2-((4-aminophenyl)diazenyl)benzoic acid, (E)-2-((4-methoxyphenyl)diazenyl)benzoic acid, (E)-2-((4-ethylphenyl)diazenyl)benzoic acid, (E)-2-((4-hydroxyphenyl)diazenyl)benzoic acid, (E)-2-((3-(dimethylamino)phenyl)diazenyl)benzoic acid, (E)-2-((2-(dimethylamino)phenyl)diazenyl)benzoic acid, (E)-2-((4-(diethylamino)phenyl)diazenyl)benzoic acid, (E)-2-((4-(methylamino)phenyl)diazenyl)benzoic acid, (E)-2-((4-(dimethylamino)naphthyl)diazenyl)benzoic acid, (E)-2-((4-(pyrrolidinyl)phenyl)diazenyl)benzoic acid, (E)-2-((4-(morpholinyl)phenyl)diazenyl)benzoic acid, (E)-2-((4-(acetamido)phenyl)diazenyl)benzoic acid, (E)-2-((4-(sulfonamido)phenyl)diazenyl)benzoic acid, (E)-2-((4-nitrophenyl)diazenyl)benzoic acid, (E)-2-((4-cyanophenyl)diazenyl)benzoic acid, (E)-2-((4-carboxyphenyl)diazenyl)benzoic acid, (E)-2-((4-formylphenyl)diazenyl)benzoic acid, (E)-2-((4-fluorophenyl)diazenyl)benzoic acid, (E)-2-((4-chlorophenyl)diazenyl)benzoic acid, (E)-2-((4-bromophenyl)diazenyl)benzoic acid, (E)-2-((4-iodophenyl)diazenyl)benzoic acid, (E)-2-((4-(dimethylamino)phenyl)diazenyl)acetic acid, (E)-2-((4-(dimethylamino)phenyl)diazenyl)propionic acid, (E)-2-((4-(dimethylamino)phenyl)diazenyl)butanoic acid, (E)-3-((4-(dimethylamino)phenyl)diazenyl)propanoic acid, (E)-4-((4-(dimethylamino)phenyl)diazenyl)butanoic acid, and (E)-2-((4-(dimethylamino)phenyl)diazenyl)thiobenzoic acid. In some embodiments, the organic diazene may include, but is not limited to, azobenzene, 4-phenylazophenol, methyl red, methyl orange, Sudan I, Sudan II, Sudan III, Sudan IV, Disperse Orange 1, Disperse Red 1, Disperse Yellow 7, 4-nitroazobenzene, 4-aminoazobenzene, Congo red, Acid Orange 7, Solvent Yellow 7, Oil Orange SS, Basic Red 18, Direct Blue 1, Direct Red 28, Direct Yellow 12, Acid Red 14, Acid Yellow 23, Ponceau 4R, Tartrazine, New Coccine, Allura Red AC, Amaranth, and Sunset Yellow FCF. In some embodiments, the organic diazene of formula (I) is (E)-2-((4-(dimethylamino)phenyl)diazenyl)benzyl carboxylic acid or a salt thereof. In a preferred embodiment, the organic diazine of formula (1) is sodium (E)-2-((4-(dimethylamino)phenyl)diazenyl)benzoate. In some embodiments, the organic diazene is present in the anolyte solution in an amount ranging from 0.1 to 10 mM, preferably 0.5 to 10 mM, preferably1 to 10 mM, preferably 2 to 10 mM, preferably 3 to 10 mM, preferably 4 to 10 mM, preferably 5 to 10 mM, preferably 6 to 10 mM, preferably 7 to 10 mM, preferably 8 to 10 mM, preferably 9 to 10 mM. In a preferred embodiment, organic diazene in the anolyte solution in an amount of 0.1 to 2 mM.

In some embodiments, the a first hydroxide base may include, but is not limited to, sodium hydroxide, lithium hydroxide, calcium hydroxide, magnesium hydroxide, barium hydroxide, strontium hydroxide, rubidium hydroxide, cesium hydroxide, ammonium hydroxide, zinc hydroxide, aluminum hydroxide, iron(II) hydroxide, iron(III) hydroxide, copper(I) hydroxide, copper(II) hydroxide, nickel(II) hydroxide, cobalt(II) hydroxide, manganese(II) hydroxide, lead(II) hydroxide, tin(II) hydroxide, tin(IV) hydroxide, cadmium hydroxide, chromium(III) hydroxide, zirconium hydroxide, yttrium hydroxide, lanthanum hydroxide, cerium(III) hydroxide, thorium hydroxide, scandium hydroxide, and indium(III) hydroxide. In a preferred embodiment, the first hydroxide base is potassium hydroxide.

In some embodiments, the anolyte solution has a first hydroxide base at a concentration ranging from 0.25 to 2.5 M, preferably 0.5 to 2.5 M, preferably 1 to 2.5 M, preferably 1.5 to 2.5 M, preferably 2 to 2.5 M. In a preferred embodiment, the concentration of potassium hydroxide as the first hydroxide base is 1 M.

In some embodiments, the catholyte solution includes an iron coordination complex and a second hydroxide base. In some embodiments, the iron coordination complex may include, but is not limited to, ferric acetylacetonate, ferrous sulfate, ferric sulfate, ferrous chloride, ferric chloride, iron (III) nitrate, iron(II) oxalate, iron(III) oxalate, iron(III) citrate, iron(II) citrate, ferric tartrate, ferrous gluconate, ferric ammonium citrate, ferrocene, ferricenium tetrafluoroborate, iron(III)-EDTA, iron(II)-EDTA, iron(III) salicylate, iron(III) thiocyanate, and iron(III) porphyrin complex. In a preferred embodiment, the iron coordination complex is ferrocyanide.

In some embodiments, the iron coordination complex is present in the catholyte solution in an amount ranging from 0.1 to 10 mM, preferably 0.5 to 10 mM, preferably 1 to 10 mM, preferably 2 to 10 mM, preferably 3 to 10 mM, preferably 4 to 10 mM, preferably 5 to 10 mM, preferably 6 to 10 mM, preferably 7 to 10 mM, preferably 8 to 10 mM, preferably 9 to 10 mM.

In some embodiments, the second hydroxide base may include, but is not limited to, sodium hydroxide, lithium hydroxide, calcium hydroxide, magnesium hydroxide, barium hydroxide, strontium hydroxide, rubidium hydroxide, cesium hydroxide, ammonium hydroxide, zinc hydroxide, aluminum hydroxide, iron(II) hydroxide, iron(III) hydroxide, copper(I) hydroxide, copper(II) hydroxide, nickel(II) hydroxide, cobalt(II) hydroxide, manganese(II) hydroxide, lead(II) hydroxide, tin(II) hydroxide, tin(IV) hydroxide, cadmium hydroxide, chromium(III) hydroxide, zirconium hydroxide, yttrium hydroxide, lanthanum hydroxide, cerium(III) hydroxide, thorium hydroxide, scandium hydroxide, and indium(III) hydroxide. In a preferred embodiment, the second hydroxide base is potassium hydroxide.

In some embodiments, the catholyte solution has a second hydroxide base concentration ranging from 0.25 to 2.5 M, preferably 0.5 to 2.5 M, preferably 1 to 2.5 M, preferably 1.5 to 2.5 M, preferably 2 to 2.5 M. In a preferred embodiment, the concentration of potassium hydroxide as the second hydroxide base is 1 M.

In some embodiments, the separator may be formed by a copolymer is not limited to, polytetrafluoroethylene (PTFE), perfluorosulfonic acid (PFSA), Nafion, sulfonated polyetheretherketone (SPEEK), poly(vinylidene fluoride)-hexafluoropropylene (PVDF-HFP), poly(vinylidene fluoride) (PVDF), poly(ethylene-co-tetrafluoroethylene) (ETFE), poly(ether ether ketone) (PEEK), perfluorocyclopropylmethylvinylidene fluoride (PCPMVDF), polychlorotrifluoroethylene (PCTFE), perfluorobutylsulfonic acid (PFBS), polytetrafluoroethylene-co-hexafluoropropylene (FEP), perfluorooctanoic acid (PFOA), perfluorinated styrene sulfonic acid (PFSSA), polyfluoroalkyl acrylates, polyfluoroethylene propylene (FEP), poly(tetrafluoroethylene-co-perfluoro-3-methyl-1-butene) (TFE-PFMB), polyperfluorodioxole, poly(perfluoropropyl vinyl ether) (PPVE), and perfluorooctylsulfonic acid (PFOS). In a preferred embodiment, the separator is formed of a tetrafluoroethylene-perfluoro(3-oxa-4-pentenesulfonic acid) copolymer.

In some embodiments, the redox flow battery has a cell potential ranging from 0.75 to 1.50 V, preferably 0.9 to 1.50 V, preferably 1.0 to 1.50 V, preferably 1.1 to 1.50 V, preferably 1.2 to 1.50 V, preferably 1.3 to 1.50 V, preferably 1.4 to 1.50 V. In a preferred embodiment, the cell potential is 1.1 V.

In some embodiments, the redox flow battery has a volumetric capacity ranging from 500 to 1000 mAh/L, preferably 600 to 1000 mAh/L, preferably 700 to 1000 mAh/L, preferably 800 to 1000 mAh/L, preferably 900 to 1000 mAh/L. In a preferred embodiment, volumetric capacity is 720 mAh/L.

In some embodiments, the redox flow battery has a coulombic efficiency of greater than 60%, preferably greater than 62%, preferably greater than 64%, preferably greater than 66%, preferably greater than 68%, preferably greater than 70%, preferably greater than 71%. In a preferred embodiment, the coulombic efficiency is 72%.

In some embodiments, the redox flow battery has a sustained discharge capacity of 10 to 30 mAh/g, preferably 12 to 30 mAh/g, preferably 15 to 30 mAh/g, preferably 17 to 30 mAh/g, preferably 20 to 30 mAh/g, preferably 24 to 30 mAh/g, preferably 26 to 30 mAh/g, preferably 28 to 30 mAh/g after 100 charge-discharge cycles at a current density of 10 mA $cm^{-2}$. In a preferred embodiment, the discharge capacity of the redox flow battery is 18 mAh/g.

FIG. 1A illustrates a schematic flowchart of a method 50 of forming the redox flow battery. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes sandwiching the separator between the positive electrode and the negative electrode. The assembly may be performed in a flow cell architecture, where the electrodes are housed in separate half-cells and the separator is clamped or fixed between them. The positive electrode and negative electrode are typically carbon felt, carbon paper, or other electrochemically inert conductive substrates. In some embodiments, these electrodes are preferably pretreated (e.g., heat-treated or acid-washed) to enhance wettability and electrochemical activity. The separator is formed of a tetrafluoroethylene-perfluoro(3-oxa-4-pentenesulfonic acid) copolymer membrane or similar ion-conductive material that is chemically stable in alkaline media. The separator allows for ion transport (e.g., OH—) while preventing physical crossover of the catholyte and anolyte solutions. The cell may be assembled within a flow battery stack or as a single cell using compression plates, current collectors, and flow frames for directing fluid streams through the electrodes.

At step 54, the method 50 includes forming the catholyte solution. The catholyte solution is prepared by dissolving a redox-active metal coordination complex, such as ferrocyanide, into an aqueous medium containing a first hydroxide base, such as potassium hydroxide (KOH).

At step 56, the method 50 includes forming the anolyte solution. The anolyte solution is prepared by dissolving the organic diazene compound of formula (I) into an aqueous solution of a hydroxide base. In some embodiments, the method of forming the organic diazene of formula (I) includes reacting an anthranilic acid derivative of formula (II) with an aniline of formula (III) in the presence of a nitrite salt (II)

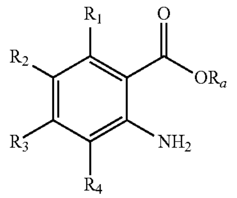

(III)

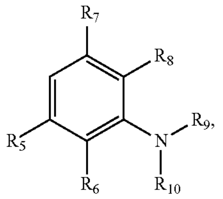

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and $R_a$ is selected from the group consisting of a hydrogen atom, an optionally substituted alkyl, an optionally substituted cycloalkyl, an optionally substituted alkoxy, an alkali metal cation, ammonium, and an organoammonium cation.

In some embodiments, anthranilic acid derivative may include, but is not limited to 4-amino benzoic acid, 3-amino benzoic acid, 2-amino benzoic acid, 5-amino benzoic acid, 4-methyl anthranilic acid, 2-methyl anthranilic acid, 3-methyl anthranilic acid, 4-hydroxy anthranilic acid, 2-hydroxy anthranilic acid, 3-hydroxy anthranilic acid, 5-hydroxy anthranilic acid, 4-nitro anthranilic acid, 2-nitro anthranilic acid, 3-nitro anthranilic acid, 4-carboxy anthranilic acid, 2-carboxy anthranilic acid, 3-carboxy anthranilic acid, 4-ethyl anthranilic acid, 2-ethyl anthranilic acid, 3-ethyl anthranilic acid, 4-chloro anthranilic acid, 2-chloro anthranilic acid, 3-chloro anthranilic acid, 4-fluoro anthranilic acid, 2-fluoro anthranilic acid, 3-fluoro anthranilic acid, 4-bromo anthranilic acid, 2-bromo anthranilic acid, and 3-bromo anthranilic acid. In a preferred embodiment, the anthranilic acid derivative of formula (II) is anthranilic acid.

In some embodiments, aniline may include, but is not limited to p-Anisidine, m-Anisidine, o-Anisidine, 4-chloroaniline, 3-chloroaniline, 2-chloroaniline, 4-bromoaniline, 3-bromoaniline, 2-bromoaniline, 4-methylaniline, 3-methylaniline, 2-methylaniline, 4-ethylaniline, 3-ethylaniline, 2-ethylaniline, 4-nitroaniline, 3-nitroaniline, 2-nitroaniline, 4-hydroxyaniline, 3-hydroxyaniline, 2-hydroxyaniline, 4-aminobenzylamine, aniline hydrochloride, 4-carboxyaniline, 3-carboxyaniline, 2-carboxyaniline, diphenylamine, 2-aminobenzylamine, 3-aminobenzylamine, and 4-aminophenylamine. In a preferred embodiment, the aniline of formula (III) is N,N-dimethylaniline.

In some embodiments, nitric salt may include, but is not limited to potassium nitrate, calcium nitrate, ammonium nitrate, barium nitrate, magnesium nitrate, zinc nitrate, copper(II) nitrate, iron(III) nitrate, lithium nitrate, sodium nitrate, manganese nitrate, cadmium nitrate, silver nitrate, strontium nitrate, cobalt(II) nitrate, nickel(II) nitrate, lead(II) nitrate, mercury(II) nitrate, chromium(III) nitrate, aluminum nitrate. In a preferred embodiment, the nitrite salt is sodium nitrite.

At step 58, the method 50 includes contacting the catholyte solution with the positive electrode and the anolyte solution with the negative electrode. This is accomplished by circulating the catholyte and anolyte solutions from their respective reservoirs through the electrode compartments using fluid pumps. The catholyte solution is directed to flow across the positive electrode, where the oxidation half-reaction occurs, and the anolyte to flow across the negative electrode, where the reduction half-reaction occurs. In some embodiments, the electrolyte solutions are typically recirculated in a closed-loop configuration, allowing for continuous redox cycling during battery operation.

Figure 7:
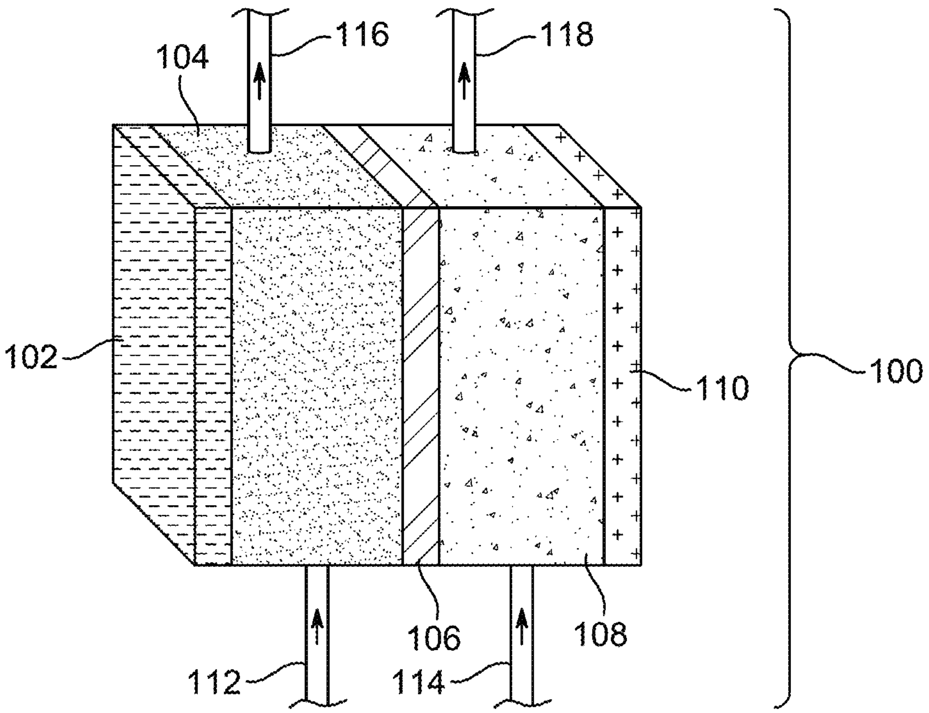
FIG. 7 illustrates a redox flow battery.

FIG. 7 illustrates an embodiment of the redox flow battery 100. The positive electrode 110, a catholyte solution in contact with the positive electrode 108, a negative electrode 102, an anolyte solution in contact with the negative electrode 104, and a separator separating the catholyte solution and the anolyte solution 106 are shown. The catholyte solution is directed to flow across the positive electrode via 114 and 118. The anolyte solution is directed to flow across the negative electrode via 112 and 116.

The following examples are provided solely for illustration and are not to be construed as limitations of the present disclosure, as many variations thereof are possible without departing from the spirit and scope of the present disclosure.

EXAMPLES

The following examples demonstrate a redox flow battery. The examples are provided solely for illustration and are not to be construed as limitations of the present disclosure, as many variations thereof are possible without departing from the spirit and scope of the present disclosure.

Example 1: Chemicals and Materials

According to the present disclosure, anthranilic acid, urea $[CO(NH_2)_2]$, sodium nitrite ($NaNO_2$), sodium carbonate ($Na_2CO_3$), potassium hydroxide (KOH) pallets, and Dowex-50W resin were procured from Sigma-Aldrich. Hydrochloric acid (HCl) and potassium ferrocyanide $[K_4Fe(CN)_6]$ were procured from Fisher Scientific Company (USA). In addition, Aquivion® E98-15S (Solvay, USA) as cation exchange membrane and 3 millimeters (mm) graphite felt (Qingdao Dongkai Graphite Co. Ltd.) electrodes (5 $cm^2$) have been used to fabricate the redox flow cell.

Figure 1B:
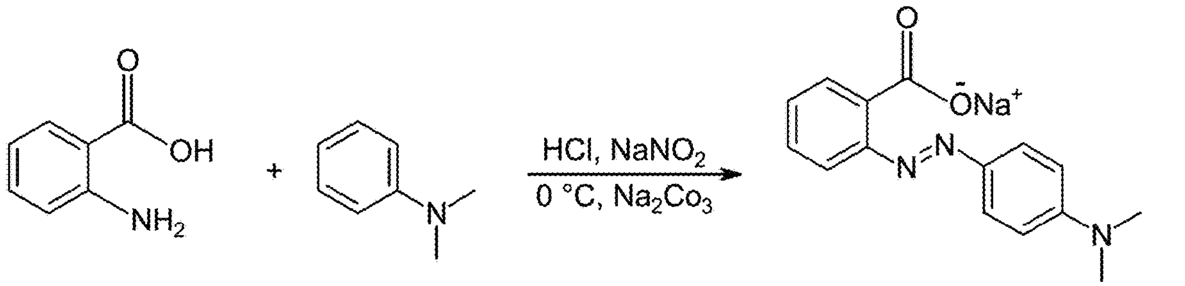
FIG. 1B illustrates an exemplary schematic reaction scheme for synthesis of sodium (E)-2-((4-(dimethylamino)phenyl)diazenyl)benzoate, according to certain embodiments.

Example 2: Synthesis Procedure of (E)-2-((4(dimethylamino)phenyl)diazenyl)benzoic acid The diazonium compound (E)-2-((4(dimethylamino)phenyl)diazenyl)benzoic acid (PDAB) was synthesized via a coupling reaction between anthranilic acid and N,N-dimethylaniline. Initially, 8 mmol of anthranilic acid was added to 50 mL of 6 M hydrochloric acid in a two-necked round-bottom flask maintained in an ice bath at a temperature below 5° C. under constant stirring. A cold aqueous solution of sodium nitrite, in excess, was added dropwise to the reaction mixture using a dropping funnel. Post stirring the resulting solution for 30 minutes, excess nitrite ions were quenched by the addition of a urea solution. Following a total reaction time of approximately 45 minutes, the prepared diazonium salt solution was added slowly to a pre-cooled alkaline solution of N,N-dimethylaniline (7 mmol) prepared in sodium carbonate. The coupling mixture was stirred continuously in the ice bath for six hours and then allowed to stand overnight. The resulting product was isolated by filtration and dried in a vacuum oven at 60° C. The acidic form of the azo dye was subsequently obtained by passing the crude product through an ion exchange column packed with Dowex-50W resin. The schematic process of synthesis is depicted in FIG. 1B.

Example 3: Electrochemical Characterization

The electrochemical properties of the redox-active species were evaluated using cyclic voltammetry (CV), chronoamperometry (CA), and electrochemical impedance spectroscopy (EIS), conducted on a computer-controlled three-electrode system (Auto-lab PGSTAT-128N) operated through Nova 2.1.4 software. A conventional three-electrode configuration was employed, consisting of a glassy working electrode (3 mm diameter), an Ag/AgCI reference electrode, and a platinum counter electrode. All measurements were carried out in a Teflon-coated Pyrex glass electrochemical cell, which was pre-cleaned with concentrated $H_2SO_4$, subsequently boiled in deionized water, and then dried in an oven. Prior to electrochemical testing, the electrolyte solution was purged with argon for 15 minutes to eliminate dissolved oxygen. In order to ensure the accuracy and reproducibility of the results, all experiments were repeated four to five times, with measurements conducted at room temperature. Redox-active solutions were prepared at a concentration of 1 mM in 1 M KOH electrolyte. Cyclic voltammograms were recorded at a scan rate of 5 mV/s to assess the current response of the species. Electrochemical impedance spectroscopy was used to determine the charge transfer resistance (Rct) at the electrode/electrolyte interface and the solution resistance (Rs). EIS measurements were performed over a frequency range of 0.1 to 100,000 Hz with an amplitude of 5 mV under open-circuit conditions. The diameter of the Nyquist plot semicircle was used to interpret the impedance characteristics. A Randles equivalent circuit model was employed to quantify Rct and Rs values in 1.0 M KOH solution. The long-term stability and durability of the redox-active compound were further assessed using chronoamperometric measurements conducted at a fixed potential of 0.75 V versus Ag/AgCl.

Example 4: Flow Cell Fabrication

A redox flow cell (Scribner, USA) was assembled including graphite bipolar plates, Viton rubber gaskets, Teflon flow frame plates, and carbon felt electrodes (5 $cm^2$) that were pre-oxidized in air at 400° C. for 24 hours. The electrodes were placed on either side of an Aquivion® E98-15S ion exchange membrane. Prior to assembly, the membrane was conditioned by soaking in 1 M KOH at 70° C. for 8 hours. The anolyte and catholyte solutions were prepared by dissolving 0.33 g of the redox-active diazenyl compound and 0.74 g of potassium ferrocyanide (HFC), respectively, in 25 mL of 1 M KOH. Electrolyte circulation was maintained at a flow rate of 100 mL per minute using a Kamoer peristaltic pump. The flow battery was operated using a Neware battery tester system interfaced with BTS software (version 8.0.0), with charge-discharge cycling conducted at a constant current of 50 mA across a voltage window of 0.2 V to 1.8 V.

Figure 2:
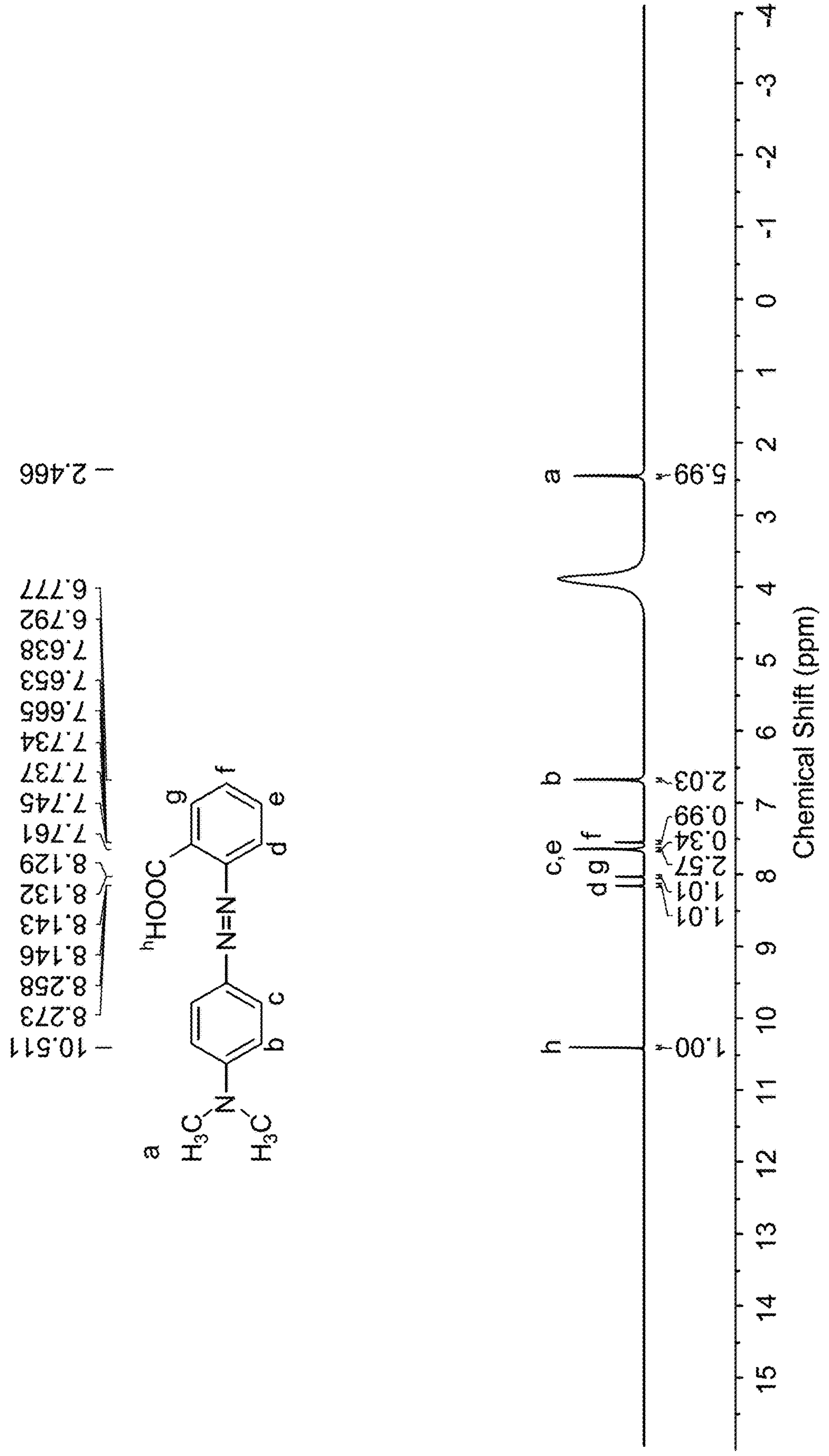
FIG. 2 illustrates a proton nuclear magnetic resonance ($^1H$ NMR) spectrum of (E)-2-((4(dimethylamino)phenyl)diazenyl)benzoic acid, showing characteristic proton resonances, according to certain embodiments.

Prior to application of the synthesized compound, sodium (E)-2-((4(dimethylamino)phenyl)diazenyl)benzoate, as an anolyte in the redox flow battery, the synthesized compound was characterized by using proton nuclear magnetic resonance ($^1H$ NMR) spectroscopy and Fourier transform infrared (FTIR) spectroscopy to confirm structural integrity. The $^1H$ NMR spectrum, recorded in DMSO-$d_6$ at 600 MHz, verified the successful synthesis and purification of the dye. The observed chemical shifts were as follows: δ 10.51 (s, 1H, OH), 8.27 (d, J=7.3 Hz, 1H), 8.14 (dd, J=7.3, 1.4 Hz, 1H), 7.75 (d, J=7.6 Hz, 3H), 7.74 (d, J=1.8 Hz), 7.65 (t, J=6.8 Hz, 1H), 6.78 (d, J=7.3 Hz, 2H), and 2.46 (s, 6H), as shown in FIG. 2.

Figure 3:
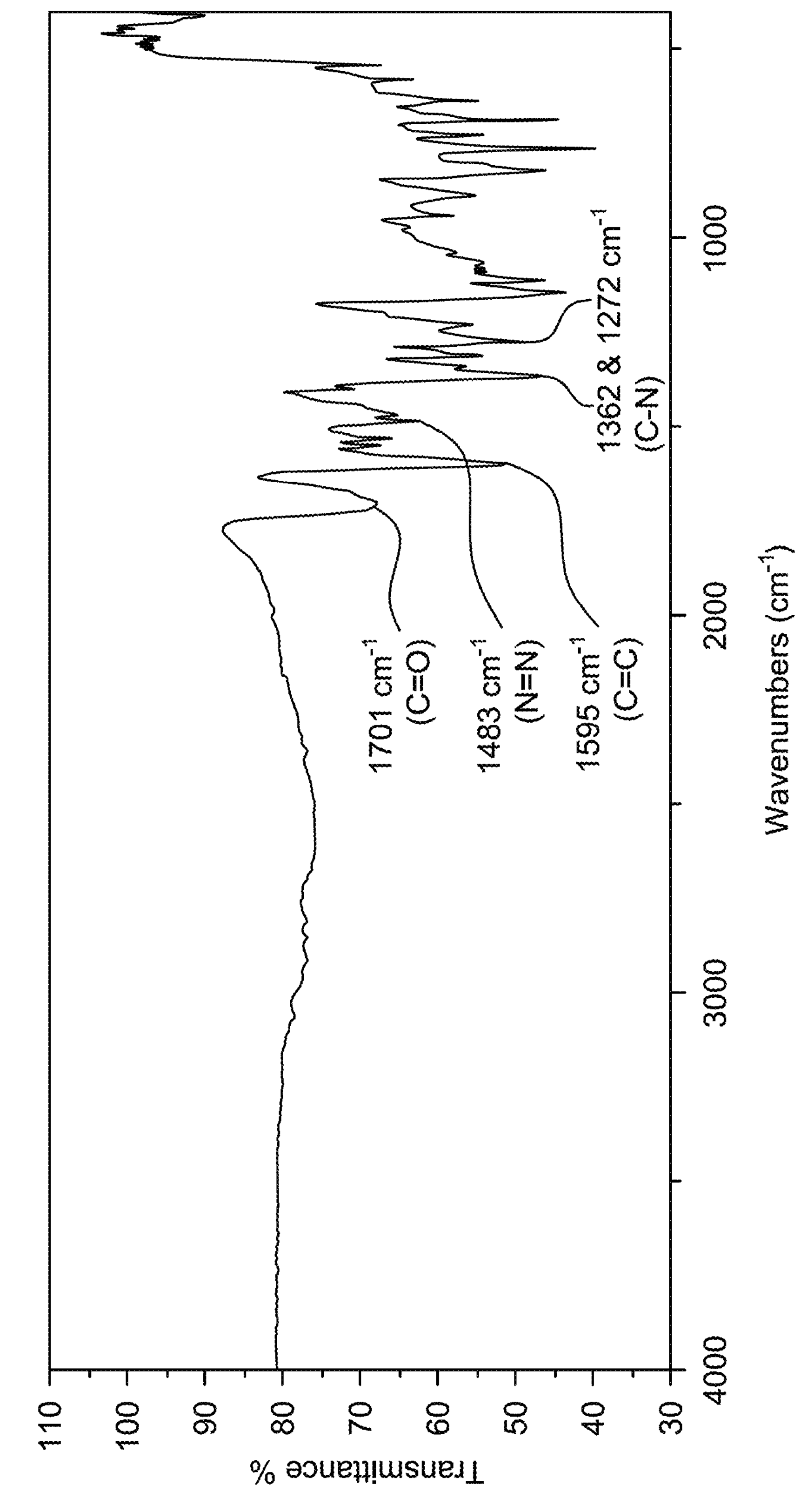
FIG. 3 illustrates a Fourier transform infrared (FTIR) spectrum of sodium (E)-2-((4(dimethylamino)phenyl)diazenyl)benzoate, showing absorption peaks corresponding to C═O, C═C, N═N, and C—N functional groups, according to certain embodiments.
Figure 4:
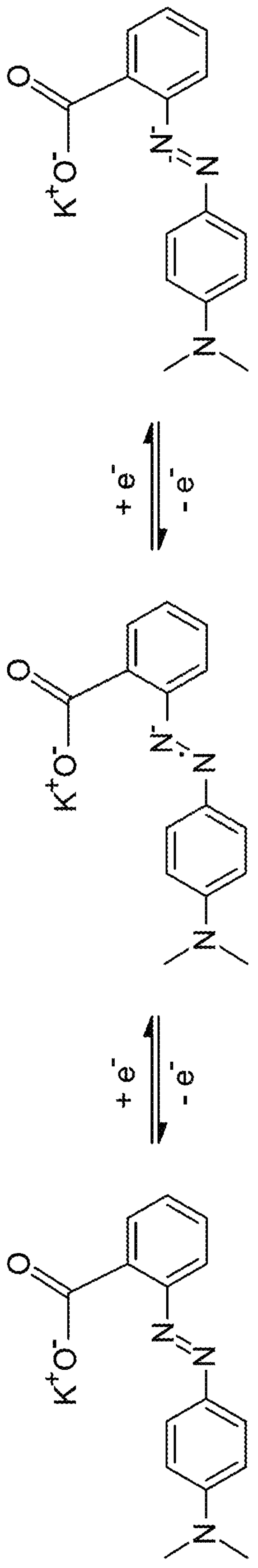
FIG. 4 illustrates a schematic representation of a proposed redox mechanism for potassium (E)-2-((4(dimethylamino)phenyl)diazenyl)benzoate, depicting a two-electron redox process involving reversible transformation between the azo (—N═N—) and hydrazo (—NH—NH—) forms during charge and discharge cycles, according to certain embodiments.

The formation of the synthesized diazo compound was further confirmed by FTIR spectroscopy, with the spectrum shown in FIG. 3. A distinct absorption band at 1701 $cm^{-1}$ was observed, corresponding to the stretching vibration of the carbonyl (C═O) group of the carboxylic acid functionality. A peak at 1595 $cm^{-1}$ was assigned to the C═C stretching of the aromatic ring, while a characteristic absorption at 1483 $cm^{-1}$ was attributed to the azo (N═N) group. Additional peaks at 1362 $cm^{-1}$ and 1272 $cm^{-1}$ were associated with C—N stretching vibrations. The utility of organic redox-active molecules containing functional groups such as C═N and C═0 in redox flow batteries has been extensively evaluated over the past decade due to their electrochemical performance. More recently, azo-functionalized redox-active species have gained attention for their electrochemical reversibility, attributed to the extended π-conjugation that imparts both structural and redox stability. The azo (—N═N—) group facilitates reversible redox reactions that are central to the charge and discharge processes of redox flow battery systems. The aforesaid redox process involves the reduction of the azo moiety to the corresponding hydrazo form (—NH—NH—) during discharge and a re-oxidation to the azo form during the charging cycle, enabling a two-electron transfer mechanism. The capacity of this reversible transformation contributes to efficient electron storage and release. For the said redox transitions to occur, the azo-based species must exhibit sufficient solubility in the chosen electrolyte medium. The reduction step induces cleavage of the azo double bond, forming hydrazo intermediates, while the reverse oxidation process restores the azo linkage, as depicted schematically in FIG. 4 [See: Wang, X.; Chai, J.; Lashgari, A.; Jiang, J. *J. Chem/Electro. Chem.*, 8, (1), 2021, 83-89 i*ncorporated herein by reference in its entirety*]. Although various organic electrolytes such as quinones, anthraquinones, and viologens have demonstrated high redox reversibility in selected derivatives, the performance of azo-based systems remains dependent on the optimization of supporting parameters such as co-electrolyte composition, pH, and the presence of stabilizing agents to suppress undesired electrochemical degradation pathways.

Figure 5A:
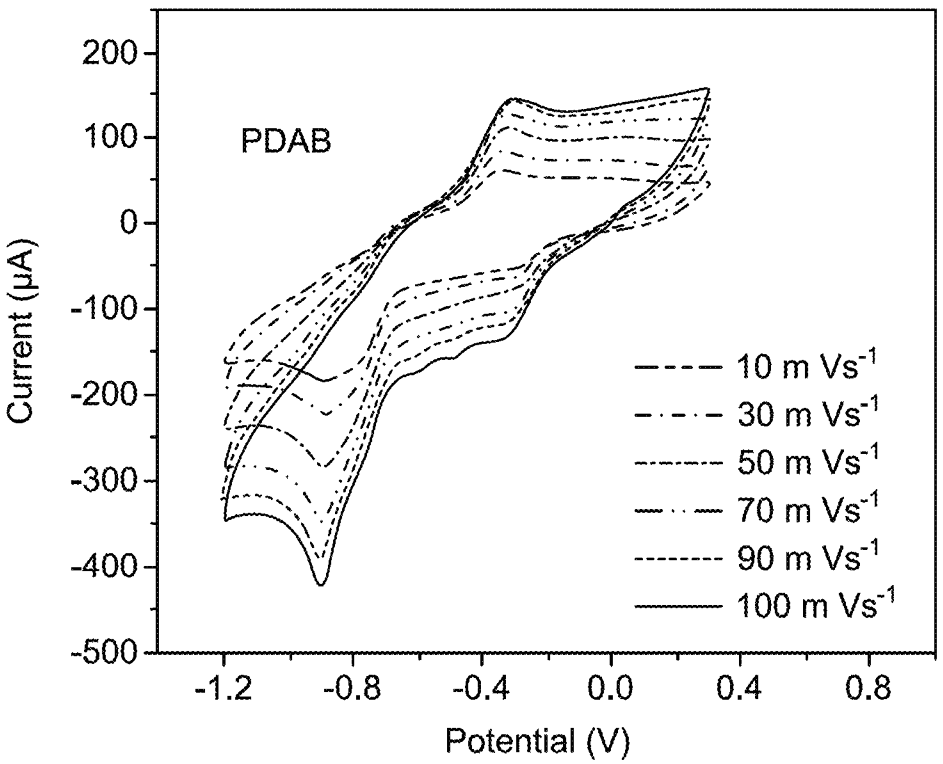
FIG. 5A illustrates cyclic voltammograms of potassium (E)-2-((4(dimethylamino)phenyl)diazenyl)benzoate (1 mM) recorded at various scan rates in 1 M KOH, according to certain embodiments.

The electrochemical behavior of the synthesized anolyte, (E)-2-((4(dimethylamino)phenyl)diazenyl)benzoic acid (PDAB), was evaluated by cyclic voltammetry (CV) in 1 M KOH across a potential range of −1.2 V to 0.3 V at scan rates varying from 10 mV $s^{-1}$ to 100 mV $s^{-1}$. The resulting voltammograms, shown in FIG. 5A, exhibited two distinct reduction peaks at approximately −0.32 V and −0.90 V, corresponding to the stepwise reduction of the azo group (N═N). The separation between the two redox peaks was observed to be 58 mV, with a linear relationship between peak current and the square root of the scan rate, indicating a diffusion-controlled redox process. The observed peak reversibility supports a Faradaic redox process that is electrochemically reversible and suitable for redox flow battery applications, confirming the electrochemical stability of the anolyte under the given alkaline conditions.

Figure 5B:
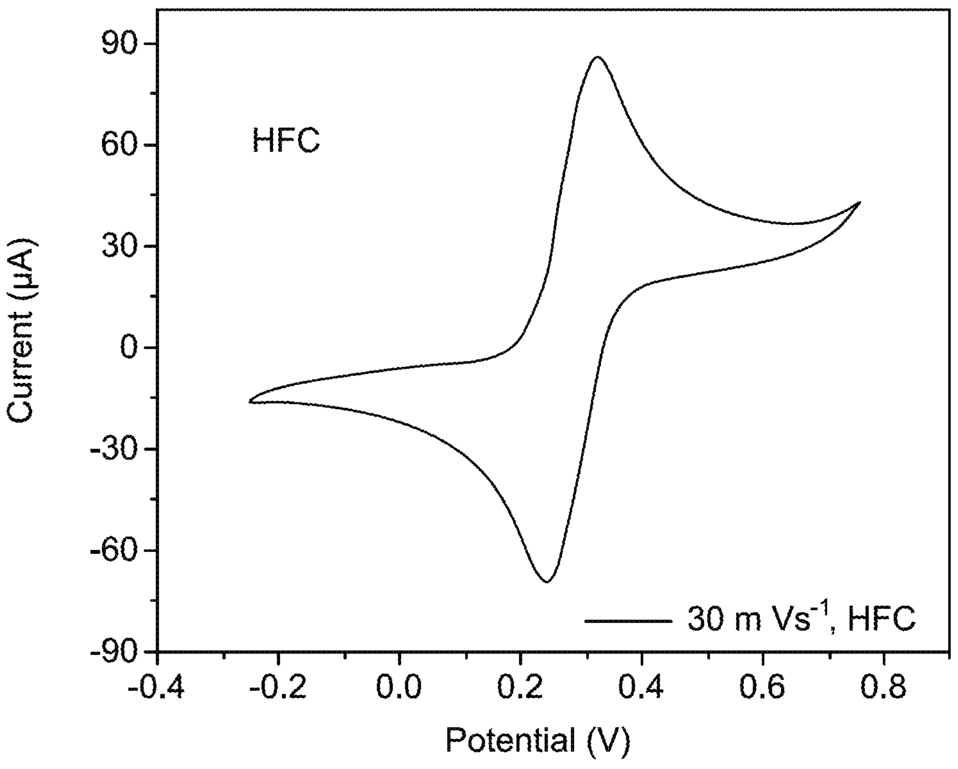
FIG. 5B illustrates the cyclic voltammogram of the catholyte, potassium ferrocyanide (1 mM), in 1 M KOH, showing the $Fe^{2+}/Fe^{3+}$ redox couple, according to certain embodiments.
Figure 5C:
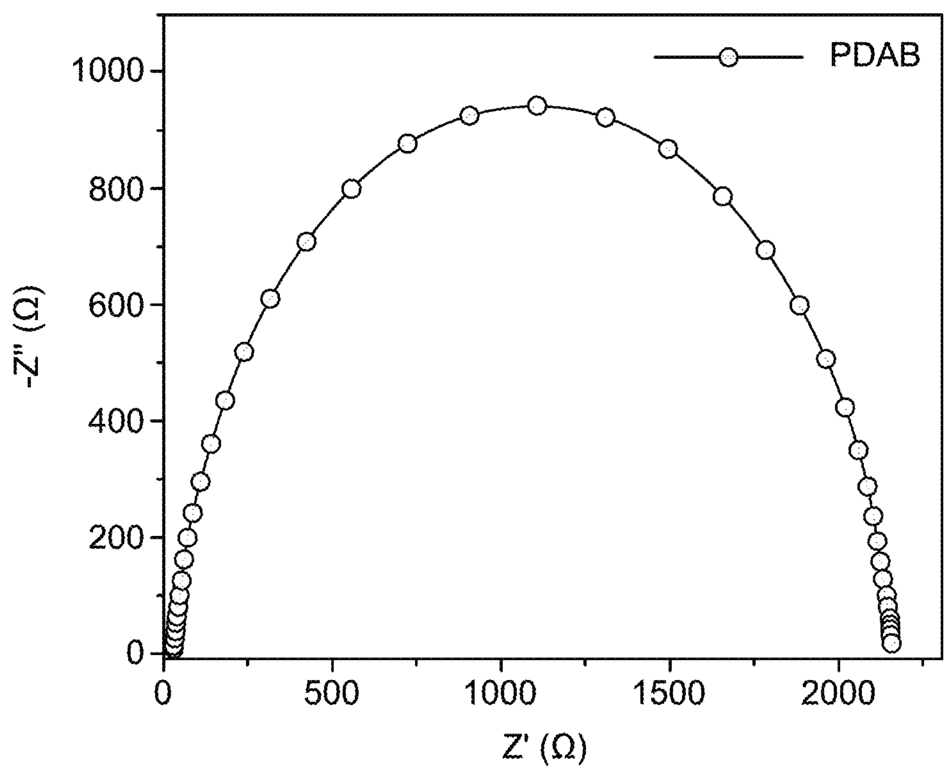
FIG. 5C illustrates a Nyquist plot obtained from electrochemical impedance spectroscopy (EIS) for the potassium (E)-2-((4(dimethylamino)phenyl)diazenyl)benzoate based electrolyte system, according to certain embodiments.
Figure 5D:
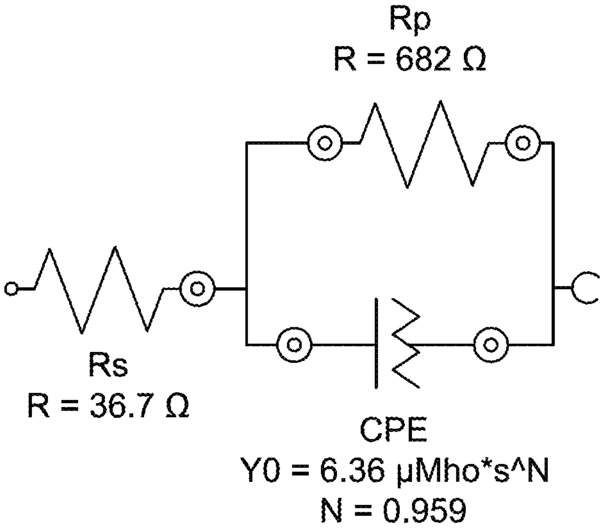
FIG. 5D illustrates the circuit diagram to calculate charge transfer resistance ($R_{ct}$) and solution resistance (Rs) values.

FIG. 5B presents the cyclic voltammogram of the standard 1 mM catholyte, potassium ferrocyanide $[K_4Fe(CN)_6]$, showing a well-defined redox couple corresponding to the $Fe^{2+}/Fe^{3+}$ transition within the ferrocyanide complex. The peak separation ($\Delta E_p$) was measured to be approximately 59 mV, indicative of a single-electron transfer process. The electrolyte kinetics were further analysed using electrochemical impedance spectroscopy (EIS) performed at an applied potential of 0.5 V versus Ag/AgCl. The Nyquist plot for the fabricated electrolyte system, shown in FIG. 5C, revealed a relatively small semicircular diameter, which is indicative of low charge transfer resistance ($R_{ct}$) and efficient electron transport across the electrode-electrolyte interface. The $R_{ct}$ value was extracted by fitting the data to a Randle-type equivalent circuit, also depicted in FIG. 5C.

Figure 5E:
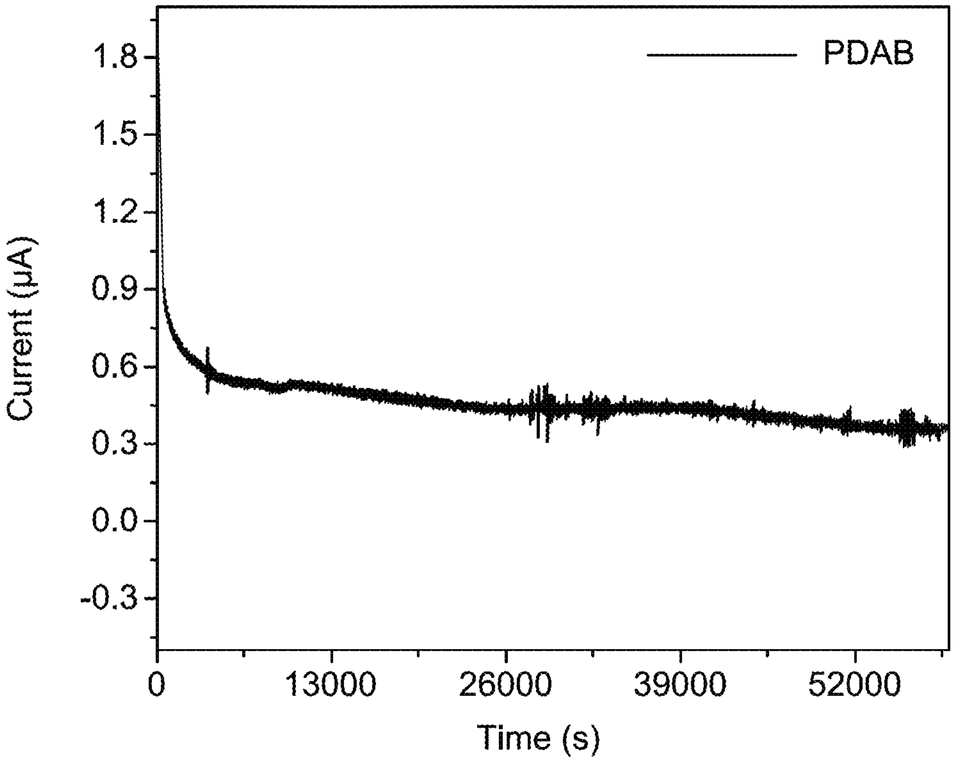
FIG. 5E illustrates a chronoamperometric response of the potassium (E)-2-((4(dimethylamino)phenyl)diazenyl)benzoate anolyte recorded at an applied potential of 0.75 V vs. Ag/AgCl over 15 hours, according to certain embodiments.

In order to assess the operational durability and electrochemical stability of the redox-active compound, chronoamperometric measurements were conducted at a constant applied potential of 0.75 V versus Ag/AgCl. As shown in FIG. 5E, the current response remained largely stable over a continuous 15-hour operation period, with minimal deviation, confirming the long-term stability of the anolyte under charge-discharge conditions.

Figure 6A:
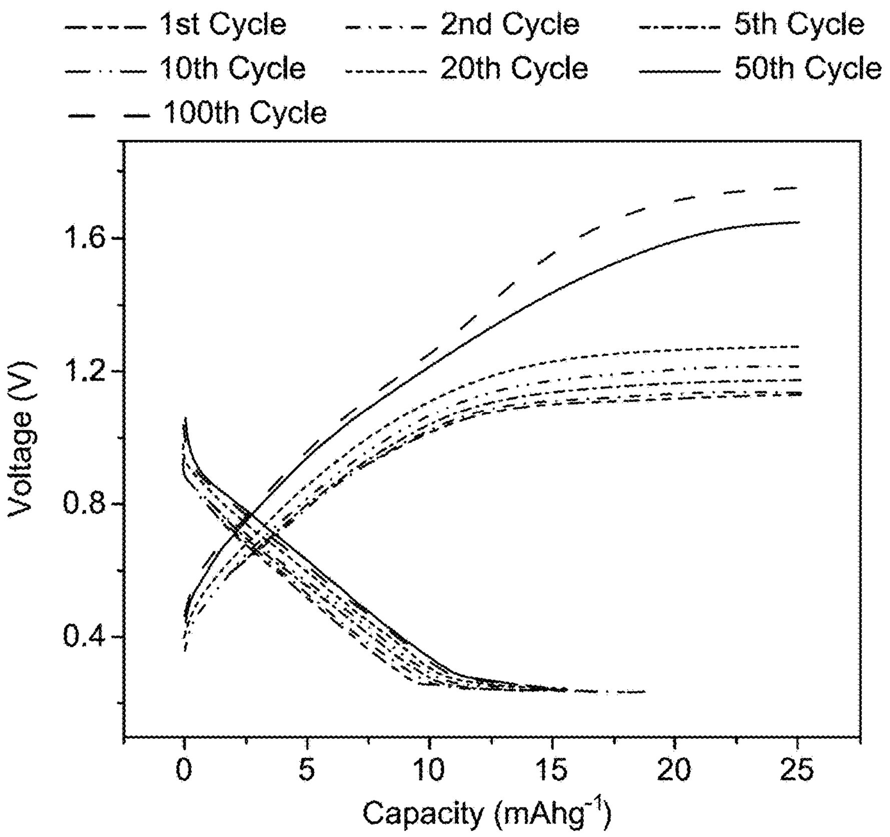
FIG. 6A illustrates the galvanostatic charge-discharge profile of the redox flow battery using potassium (E)-2-((4(dimethylamino)phenyl)diazenyl)benzoate as the anolyte and potassium ferrocyanide as the catholyte, recorded at a constant current of 50 mA within a voltage window of 0.1-1.8 V, according to certain embodiments.
Figure 6B:
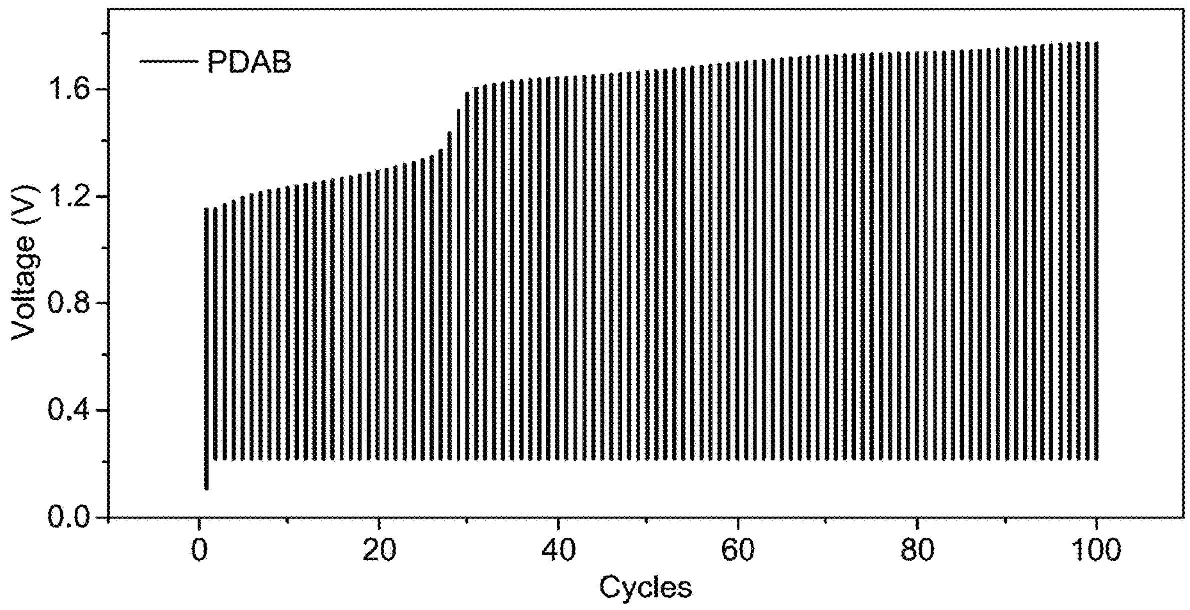
FIG. 6B illustrates the variation in charge voltage over multiple cycles, showing a gradual increase in the charging plateau, attributed to evolving overpotentials during repeated operation, according to certain embodiments.
Figure 6C:
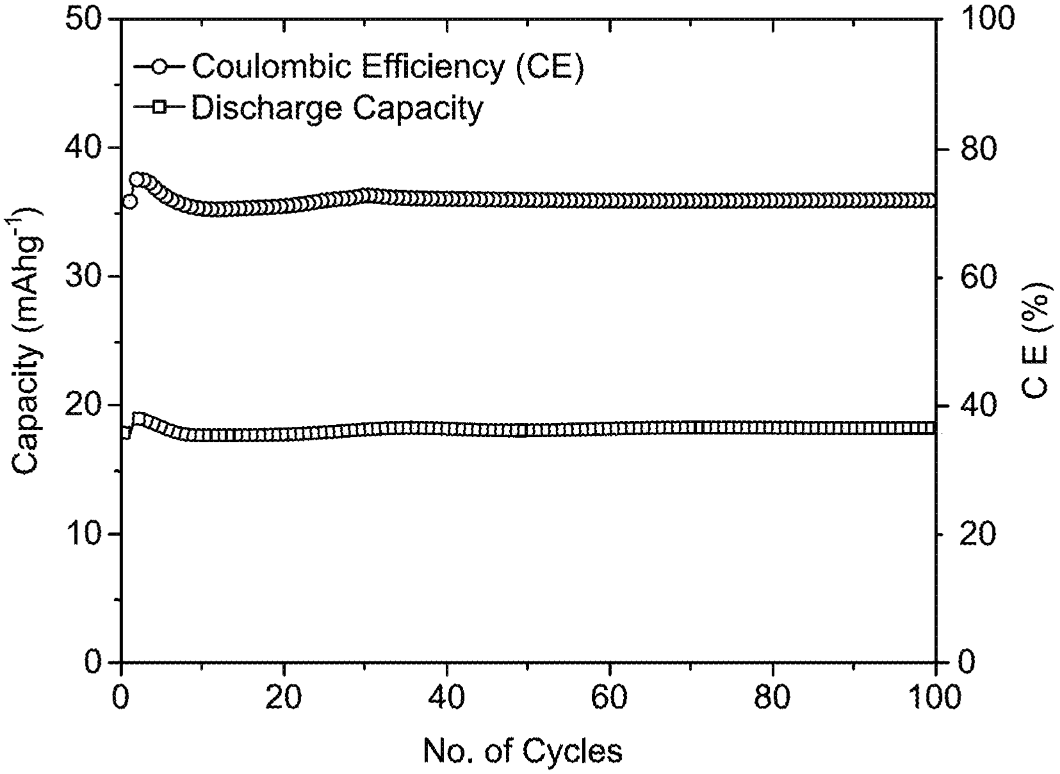
FIG. 6C illustrates the cycling performance and Coulombic efficiency (CE) of the redox flow battery over 100 cycles, according to certain embodiments.
Figure 6D:
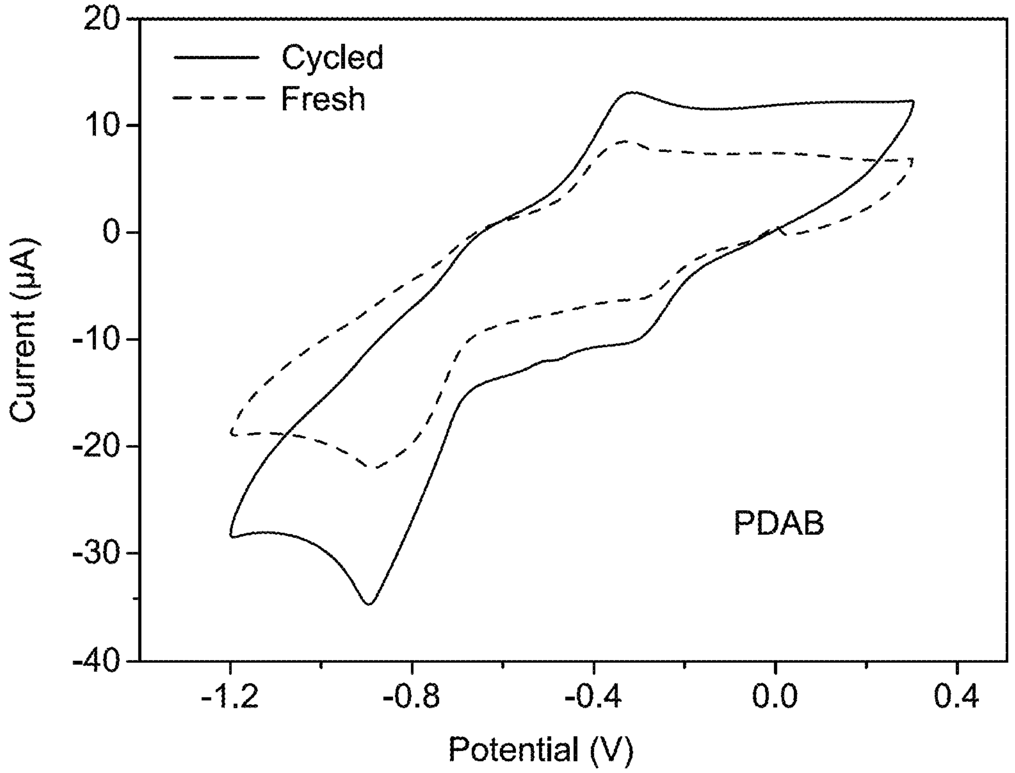
FIG. 6D illustrates the cyclic voltammograms of the potassium (E)-2-((4(dimethylamino)phenyl)diazenyl)benzoate anolyte recorded before and after 100 charge-discharge cycles, according to certain embodiments.

The galvanostatic charge-discharge behavior of the assembled redox flow cell was evaluated at a constant current of 50 mA within a voltage window of 0.1 V to 1.8 V, under ambient atmospheric conditions. The charge-discharge cycling was conducted for 10-minute intervals, and the results are shown in FIG. 6A. In the first cycle, the charging and discharging capacities were recorded as 25.0 mAh $g^{-1}$ and 17.8 mAh $g^{-1}$, respectively, corresponding to a Coulombic efficiency (CE) of approximately 71.2%. The initially observed lower performance was attributed to polarization effects arising from ohmic resistances in the system, charge transfer overpotentials at the electrode-electrolyte interface, and environmental factors inherent to the ambient testing conditions. In the second cycle, the discharge capacity increased to 18.7 mAh $g^{-1}$, with an improved CE of 74.8%, suggesting that some interfacial capacity loss mechanisms active during the first cycle were no longer influential. As illustrated in FIG. 6C, the cell demonstrated stable performance through 100 cycles, with a CE of approximately 72% in the 100th cycle. A progressive increase in the charging plateau voltage was also observed over repeated cycling, commencing near 1.2 V and gradually rising toward the upper charging limit of 1.8 V, as shown in FIG. 6B. The foregoing increase in overpotential did not significantly impact the CE or discharge capacity, although the increase may be indicative of charge transfer overpotential effects at the electrode interface, potentially contributing to long-term energy inefficiency and anolyte variation. A portion of the discharge capacity occurring at lower voltages was noted to be suboptimal. The cumulative increase in charging voltage, coupled with CE decline and diminished discharge capacity at lower voltages, may also be attributable to atmospheric exposure during ambient testing conditions. It is anticipated that such performance metrics may be enhanced through optimization of system parameters including membrane selection, electrolyte formulation, and additive screening. In order to assess the electrochemical integrity of the redox-active species post-cycling, cyclic voltammetry was performed. As shown in FIG. 6D, the CV profiles obtained before and after cycling displayed highly overlapping redox peaks with minimal peak-to-peak separation ($\Delta E_p$), confirming the electrochemical reversibility of the redox process and supporting the kinetic viability of the anolyte under the tested conditions [See: Eftekhari, A. *Sustainable Energy & Fuels* 2017, 1, (10), 2053-2060, Lima, A. R. F.; Pereira, R. C.; Azevedo, J.; Mendes, A.; De Melo, J. S. S. *Journal of Molecular Liquids* 336, 2021, 116364, and Ma, D.; Hu, B.; Wu, W.; Liu, X.; Zai, J.; Shu, C.; Tadesse Tsega, T.; Chen, L.; Qian, X.; Liu, T. L. *Nature Communications* 10, (1), 2019, 3367, both incorporated herein by reference in its entirety].

The aspects of the present disclosure provide a redox flow battery including a positive electrode, a catholyte solution in contact with the positive electrode, a negative electrode, an anolyte solution in contact with the negative electrode and a separator. In particular, the described aqueous organic redox flow battery system utilizes a low molecular mass azobenzene-based compound, (E)-2-((4(dimethylamino)phenyl)diazenyl)benzoic acid (PDAB), as an anolyte material. The PDAB compound was synthesized and structurally confirmed through $^1H$ NMR and Fourier transform infrared (FTIR) spectroscopy. Electrochemical analysis demonstrated reversible redox behavior with diffusion-controlled characteristics and suitable electron-transfer kinetics under alkaline conditions. When employed in a flow battery configuration with potassium ferrocyanide as the catholyte and operated at a current of 50 mA, the redox flow battery achieved an initial discharge capacity of 17.8 mAh $g^{-1}$ and maintained a volumetric capacity of 720 mAh $L^{-1}$ with approximately 72% Coulombic efficiency over 100 charge-discharge cycles. The average capacity decay rate was calculated as 0.037 per cycle, with a cumulative capacity retention of 99.96%, indicating long-term electrochemical stability of the anolyte. Despite the availability of azo compounds and the diverse functionalization strategies possible through molecular design, application in redox flow battery systems remains limited. The present disclosure establishes that azobenzene-based electrolytes may be structurally tuned to achieve high aqueous solubility and electrochemical reversibility. The incorporation of suitable hydrophilic substituents on the diazene core expands the applicability of such low molecular weight organic molecules in aqueous redox systems for energy storage applications, addressing the solubility and stability challenges typically associated with azo-based redox chemistries.

Numerous modifications and variations of the present disclosure are possible in light of the above teachings. It is therefore to be understood that within the scope of the appended claims, the invention may be practiced otherwise than as specifically described herein.

The invention claimed is:

1. A redox flow battery, comprising:

a positive electrode;

a catholyte solution in contact with the positive electrode;

a negative electrode;

an anolyte solution in contact with the negative electrode; and a separator separating the catholyte solution and the anolyte solution, wherein the anolyte solution comprises an organic diazene of formula (I) and a first hydroxide base (I)

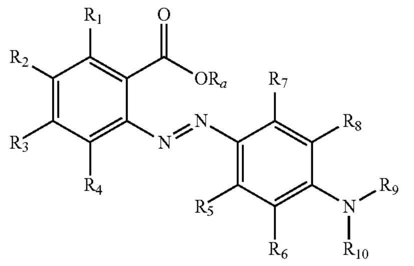

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and $R_a$ is selected from the group consisting of a hydrogen atom, an optionally substituted alkyl, an optionally substituted cycloalkyl, an optionally substituted alkoxy, an alkali metal cation, ammonium, and an organoammonium cation;

wherein the catholyte solution comprises an iron coordination complex in an amount of 0.1 to 10 mM and a second hydroxide base; and wherein the organic diazene is present in the anolyte solution in an amount of 0.1 to 10 mM.

2. The redox flow battery of claim 1, wherein the organic diazene of formula (I) is (E)-2-((4-(dimethylamino)phenyl)diazenyl)benzyl carboxylic acid or a salt thereof.

3. The redox flow battery of claim 2, wherein the organic diazine of formula (1) is sodium (E)-2-((4-(dimethylamino)phenyl)diazenyl)benzoate.

4. The redox flow battery of claim 1, wherein the first hydroxide base is potassium hydroxide.

5. The redox flow battery of claim 1, wherein the anolyte solution has a hydroxide base concentration of 0.25 to 2.5 M.

6. The redox flow battery of claim 1, wherein the iron coordination complex is ferrocyanide.

7. The redox flow battery of claim 1, wherein the catholyte solution has a hydroxide base concentration of 0.25 to 2.5 M.

8. The redox flow battery of claim 1, wherein the second hydroxide base is potassium hydroxide.

9. The redox flow battery of claim 1, having a cell potential of 0.75 to 1.50 V.

10. The redox flow battery of claim 1, having a volumetric capacity of 500 to 1000 mAh/L.

11. The redox flow battery of claim 1, having a coulombic efficiency of greater than 60%.

12. The redox flow battery of claim 1, having a sustained a discharge capacity of 10 to 30 mAh/g after 100 charge-discharge cycles at a current density of 10 mA $cm^{-2}$.

13. The redox flow battery of claim 1, wherein the positive electrode and negative electrode are each a carbon felt electrode.

14. The redox flow battery of claim 1, wherein the separator is formed of a tetrafluoroethylene-perfluoro(3-oxa-4-pentenesulfonic acid) copolymer.

15. A method of forming the redox flow battery of claim 1, the method comprising sandwiching the separator between the positive electrode and the negative electrode, forming the catholyte solution;

forming the anolyte solution; and contacting the catholyte solution with the positive electrode and the anolyte solution with the negative electrode.

16. The method of claim 15, further comprising forming the organic diazene of formula (I) by reacting an anthranilic acid derivative of formula (II) with an aniline of formula (III) in the presence of a nitrite salt,

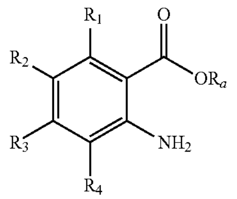

(II)

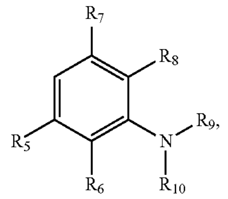

(III)

where $R_1$-$R_{10}$ are each independently selected from the group consisting of a hydrogen atom, an optionally substituted alkyl, an optionally substituted cycloalkyl, an optionally substituted alkoxy, a hydroxyl group, a halogen group, an amine group, a nitro group, and a cyano group, and $R_a$ is selected from the group consisting of a hydrogen atom, an optionally substituted alkyl, an optionally substituted cycloalkyl, an optionally substituted alkoxy, an alkali metal cation, ammonium, and an organoammonium cation.

17. The method of claim 16, wherein the anthranilic acid derivative of formula (II) is anthranilic acid;

the aniline of formula (III) is N,N-dimethylaniline; and the nitrite salt is sodium nitrite.

* * * * *